United States Patent
Takahashi

(10) Patent No.: US 10,974,735 B2
(45) Date of Patent: Apr. 13, 2021

(54) PARKING ASSISTANCE DEVICE

(71) Applicant: HITACHI AUTOMOTIVE SYSTEMS, LTD., Hitachinaka (JP)

(72) Inventor: Koji Takahashi, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/622,740

(22) PCT Filed: Mar. 29, 2018

(86) PCT No.: PCT/JP2018/013119
§ 371 (c)(1),
(2) Date: Dec. 13, 2019

(87) PCT Pub. No.: WO2019/003533
PCT Pub. Date: Jan. 3, 2019

(65) Prior Publication Data
US 2020/0101984 A1 Apr. 2, 2020

(30) Foreign Application Priority Data
Jun. 26, 2017 (JP) .............................. JP2017-124021

(51) Int. Cl.
*B60W 30/06* (2006.01)
*B60W 50/14* (2020.01)
(Continued)

(52) U.S. Cl.
CPC ............ *B60W 50/14* (2013.01); *B60W 30/06* (2013.01); *B60W 40/06* (2013.01);
(Continued)

(58) Field of Classification Search
CPC ...... B60W 50/14; B60W 30/06; B60W 40/06; B60W 2554/00; B60W 2050/146; G06K 9/00805
See application file for complete search history.

(56) References Cited

U.S. PATENT DOCUMENTS 7,218,758 B2 * 5/2007 Ishii ..................... B60R 1/00
340/933
7,741,961 B1 * 6/2010 Rafii ................... B60Q 9/005
340/435
(Continued)

FOREIGN PATENT DOCUMENTS

DE 10 2013 015 348 A1 4/2014
DE 10 2016 013 711 A1 5/2017
(Continued)

OTHER PUBLICATIONS

International Search Report with English translation and Written Opinion issued in corresponding application No. PCT/JP2018/013119 dated Jul. 24, 2018.
(Continued)

*Primary Examiner* — Nay Tun
(74) *Attorney, Agent, or Firm* — Foley & Lardner LLP

(57) ABSTRACT

Parking a vehicle at a location where parking is possible even when an obstacle is falsely detected. In a parking assistance device 1, an external environment recognition unit 11 recognizes road surface environment around an own vehicle on the basis of information detected by an external environment sensor 4 installed in the own vehicle. The display control unit 17 performs screen display using the HMI device 2 to present, to an occupant of the own vehicle, road surface information indicating the presence of an obstacle on the road surface around the own vehicle on the basis of the road surface environment recognized by the external environment recognition unit 11. The road surface
(Continued)

information correction unit 16 corrects the road surface information and invalidates the obstacle. The parking route calculation unit 14 calculates a parking route for parking the own vehicle on the basis of the road surface information corrected by the road surface information correction unit 16.

5 Claims, 16 Drawing Sheets

(51) Int. Cl.
    *B60W 40/06*    (2012.01)
    *G06K 9/00*    (2006.01)

(52) U.S. Cl.
    CPC ... *G06K 9/00805* (2013.01); *B60W 2050/146* (2013.01); *B60W 2554/00* (2020.02)

(56) References Cited

U.S. PATENT DOCUMENTS

| | | | | |
|---|---|---|---|---|
| 8,009,868 | B2* | 8/2011 | Abe | H04N 7/181 |
| | | | | 382/104 |
| 9,476,976 | B2* | 10/2016 | Kijima | B60W 30/0956 |
| 9,489,635 | B1* | 11/2016 | Zhu | G06K 9/6263 |
| 10,173,670 | B2* | 1/2019 | Hayakawa | G08G 1/143 |
| 2014/0368655 | A1* | 12/2014 | Schlittenbauer | G06T 17/00 |
| | | | | 348/148 |
| 2020/0062242 | A1* | 2/2020 | Hayakawa | G08G 1/143 |

FOREIGN PATENT DOCUMENTS

| | | | | |
|---|---|---|---|---|
| JP | 05002409 | A | * | 1/1993 |
| JP | H05-002409 | A | | 1/1993 |
| JP | 2009-070174 | A | | 4/2009 |
| JP | 2009070174 | A | * | 4/2009 |
| JP | 2009-134685 | A | | 6/2009 |
| JP | 2009134685 | A | * | 6/2009 |
| JP | 2013-241088 | A | | 12/2013 |
| JP | 2013241088 | A | * | 12/2013 |

OTHER PUBLICATIONS

Extended European Search Report issued in corresponding European Patent Application No. 18825131.8 dated Feb. 18, 2021.

* cited by examiner

PARKING ASSISTANCE DEVICE

TECHNICAL FIELD

The present invention relates to a parking assistance device that assists parking of a vehicle.

BACKGROUND ART

There is conventionally known a parking assistance device that assists a vehicle to move to an appropriate parking position while avoiding an obstacle at the time of parking the vehicle. Patent Literature 1 discloses a parking assistance device including: an external detection sensor input processing unit that generates surrounding information on the basis of sensor input from an external detection sensor that detects the outside of a vehicle; a parking position setting unit that sets a parking position; a virtual obstacle generation unit that generates virtual information on the basis of the parking position set by the parking position setting unit; and a parking route generation unit that generates a parking route from the current position of the vehicle to the parking position on the basis of the surrounding information and the virtual obstacle information.

CITATION LIST

Patent Literature

PTL 1: JP 2013-241088 A

SUMMARY OF INVENTION

Technical Problem

The parking assistance device disclosed in Patent Literature 1 detects an obstacle present around the vehicle using an external detection sensor such as radar, an ultrasonic sensor, or a camera. Therefore, in a case where these external detection sensors falsely detect an object that is not an obstacle as an obstacle, the location where parking is actually possible might be judged that there is an obstacle, leading to a problem that the vehicle cannot be parked at that location.

Solution to Problem

The parking assistance device according to the present invention includes: an external environment recognition unit that recognizes a road surface environment around a vehicle on the basis of information detected by an external environment sensor installed in the vehicle; an information presenting unit that presents, to an occupant of the vehicle, road surface information indicating a presence of an obstacle on a road surface around the vehicle on the basis of the road surface environment recognized by the external environment recognition unit; a road surface information correction unit that corrects the road surface information and invalidates the obstacle; and a parking route calculation unit that calculates a parking route for parking the vehicle on the basis of the road surface information corrected by the road surface information correction unit.

Advantageous Effects of Invention

According to the present invention, it is possible to park a vehicle at a location where parking is possible even when an obstacle is falsely detected.

DESCRIPTION OF EMBODIMENTS

Figure 1:
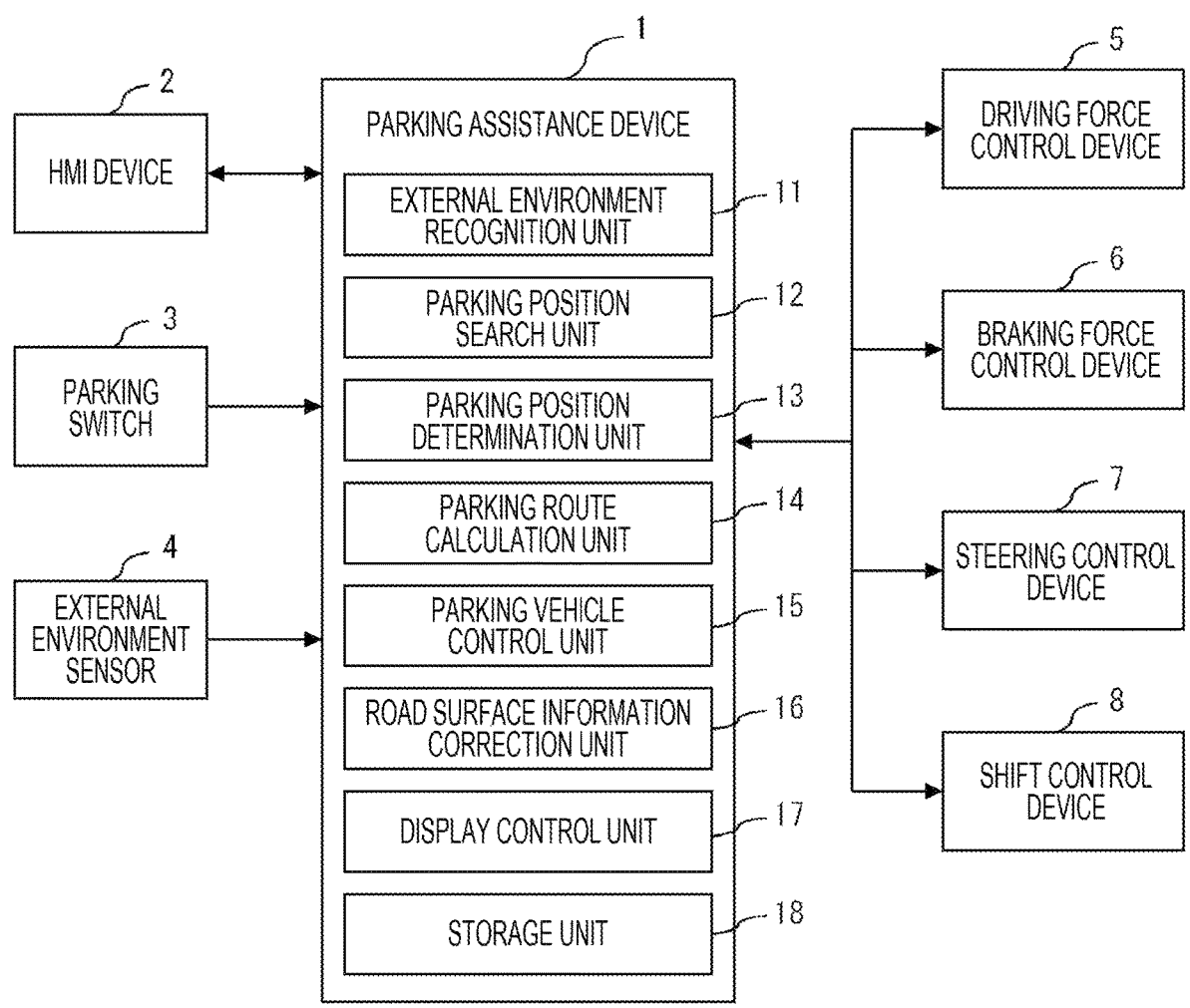
FIG. 1 is a diagram illustrating a configuration of a parking assistance device according to an embodiment of the present invention.

FIG. 1 is a diagram illustrating a configuration of a parking assistance device 1 according to an embodiment of the present invention. The parking assistance device 1 illustrated in FIG. 1 is mounted on a vehicle, and connected to an HMI (human machine interface) device 2, a parking switch 3, an external environment sensor 4, a driving force control device 5, a braking force control device 6, a steering control device 7, and a shift control device 8. Note that hereinafter, the vehicle on which the parking assistance device 1 is mounted will be called "an own vehicle." The parking assistance device 1 includes an external environment recognition unit 11, a parking position search unit 12, a parking position determination unit 13, a parking route calculation unit 14, a parking vehicle control unit 15, a road surface information correction unit 16, a display control unit 17, and a storage unit 18.

The HMI device 2 is a device that presents various pieces of information to the occupant of the own vehicle, receives various operation inputs from the occupant of the own vehicle, and outputs the operation to the parking assistance device 1. The HMI device 2 is implemented by a touch panel, for example.

The parking switch 3 is a switch to be operated when the occupant of the own vehicle operates the parking assistance device 1. The parking switch 3 is a physical switch installed on an instrument panel of the own vehicle, for example. Note that the HMI device 2 may be used as the parking switch 3.

The external environment sensor 4 detects the external situation around the own vehicle, and outputs detection information according to the detection result to the parking assistance device 1. The external environment sensor 4 includes a sensor capable of two-dimensional detection around the own vehicle, such as a camera, and a sensor capable of three-dimensional detection around the own vehicle, such as sonar. Note that sensors other than a camera or sonar, such as millimeter wave radar or a stereo camera may be used as the external environment sensor 4.

The driving force control device 5, the braking force control device 6, the steering control device 7, and the shift control device 8 are devices that respectively control the engine, the braking, the steering, and the transmission of the own vehicle. These devices operate to automatically park the own vehicle under the parking vehicle control performed by the parking assistance device 1.

The external environment recognition unit 11 recognizes the road surface environment around the own vehicle at the parking of the own vehicle on the basis of the detection information output from the external environment sensor 4. The parking position search unit 12 searches for a candidate for a parking position at which the own vehicle parks on the basis of the road surface environment recognized by the external environment recognition unit 11. The parking position determination unit 13 determines a parking position at which the own vehicle is to actually park from among the parking position candidates found in the search by the parking position search unit 12. The parking route calculation unit 14 calculates a parking route for parking the own vehicle at the parking position determined by the parking position determination unit 13. The parking vehicle control unit 15 performs parking vehicle control based on the parking route calculated by the parking route calculation unit 14 and moves the own vehicle to the parking position. In a case where an obstacle exists on the road surface around the own vehicle, the road surface information correction unit 16 corrects road surface information in accordance with the operation of the occupant of the own vehicle.

The display control unit 17 causes the HMI device 2 to perform various screen displays to present information to the occupant of the own vehicle. The screen displayed on the HMI device 2 under the control of the display control unit 17 includes, for example, a road surface information correction screen described below to be used when the road surface information correction unit 16 corrects road surface information. The storage unit 18 stores various pieces of information used for the operation of the parking assistance device 1. The information stored in the storage unit 18 includes, for example, a correction history of the road surface information generated by the road surface information correction unit 16.

In the parking assistance device 1, the external environment recognition unit 11, the parking position search unit 12, the parking position determination unit 13, the parking route calculation unit 14, the parking vehicle control unit 15, the road surface information correction unit 16, and the display control unit 17 are implemented by processing performed by a CPU (not illustrated). Meanwhile, the storage unit 18 is implemented by, for example, a flash memory or a hard disk drive (HDD) which is not illustrated. The storage unit 18 may store programs enabling the CPU to operate as the external environment recognition unit 11, the parking position search unit 12, the parking position determination unit 13, the parking route calculation unit 14, the parking vehicle control unit 15, the road surface information correction unit 16, and the display control unit 17.

Figure 2:
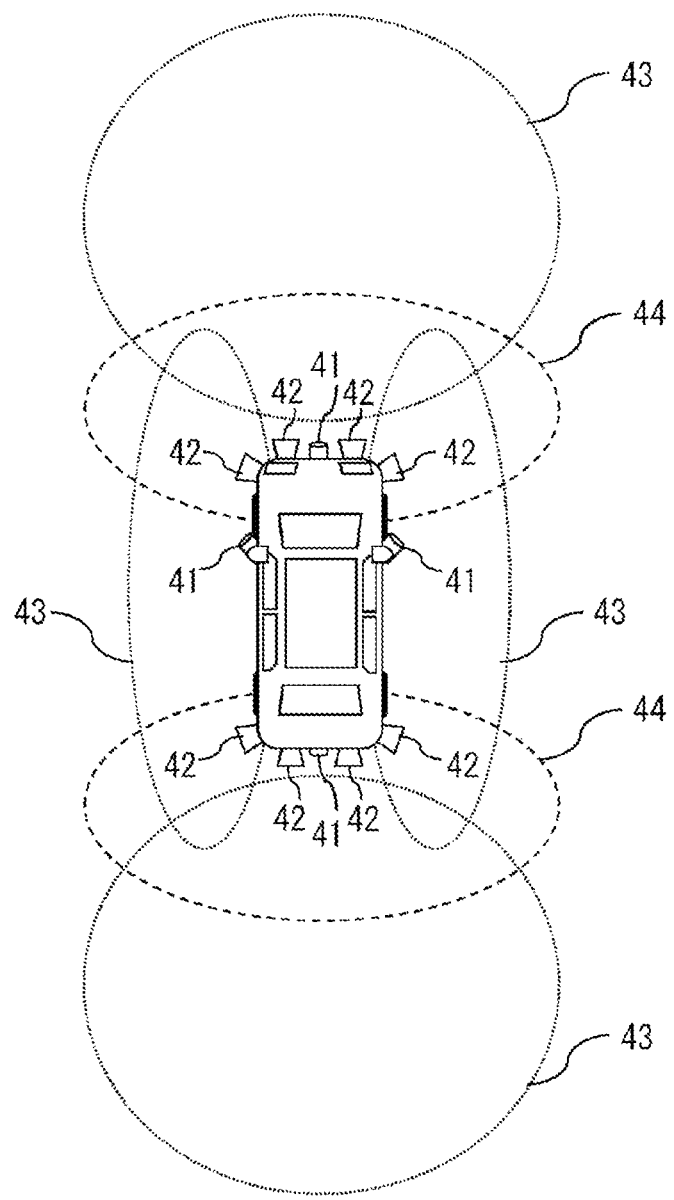
FIG. 2 is a view illustrating an example of an installation position and a detection range of an external environment sensor.

FIG. 2 is a view illustrating an example of an installation position and a detection range of the external environment sensor 4. As illustrated in FIG. 2, the external environment sensor 4 includes a plurality of cameras 41 and a plurality of devices of sonar 42 each attached to the front, rear, left and right of the own vehicle. In this case, for example, the road surface environment within a detection range 43 is two-dimensionally detected by the cameras 41, and the road surface environment in a detection range 44 is three-dimensionally detected by the sonar 42, for example. The external environment recognition unit 11 recognizes the road surface environment around the own vehicle from these detection results. In a case where there is a parking frame or an obstacle on the road surface around the own vehicle, the external environment recognition unit 11 grasps the positions of these. Note that the installation positions and detection ranges of the individual sensors illustrated in FIG. 2 are merely examples. The present invention is not limited to these as long as the road surface environment around the own vehicle necessary for parking can be appropriately detected.

Figure 3:
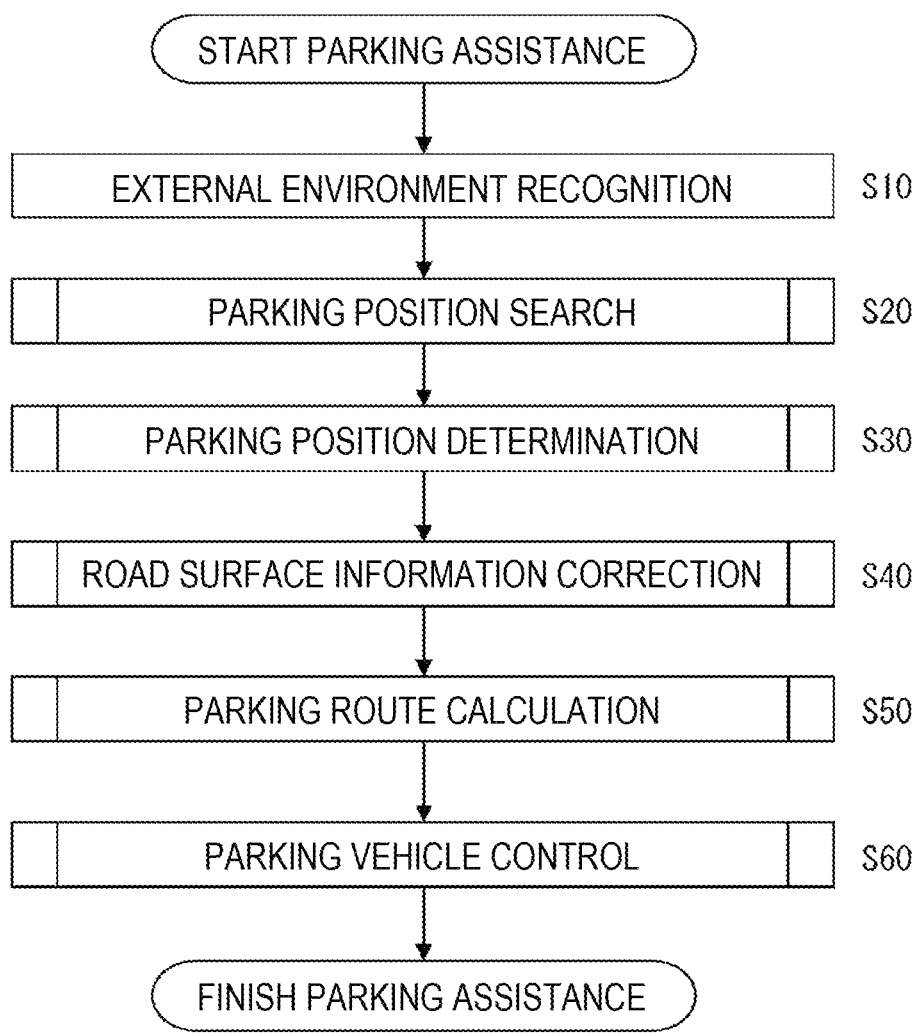
FIG. 3 is a flowchart illustrating operation of a parking assistance device at the time of performing parking assistance.

Next, details of the parking assistance of the own vehicle performed by the parking assistance device 1 will be described. FIG. 3 is a flowchart illustrating operation of the parking assistance device 1 at the time of parking assistance. When the parking switch 3 is operated by the occupant of the own vehicle, the parking assistance device 1 starts parking assistance of the own vehicle in accordance with the flowchart illustrated in FIG. 3.

In step S10, the external environment recognition unit 11 performs external environment recognition processing based on the information detected by the external environment sensor 4. The external environment recognition processing recognizes the road surface environment around the own vehicle from the information detected by the external environment sensor 4 directed to the detection ranges 43 and 44 of FIG. 2 as the target range, for example.

In step S20, the parking position search unit 12 performs parking position search processing. The parking position search processing searches for a candidate for a parking position at which the own vehicle can park within a predetermined range on the basis of the road surface environment around the own vehicle recognized in step S10. Note that details of the parking position search processing will be described below with reference to the flowchart of FIG. 4.

In step S30, the parking position determination unit 13 performs parking position determination processing. The parking position determination processing determines a parking position to which the own vehicle is to be moved for parking from among the candidates of the parking position found in the search of step S20. Note that details of the parking position determination processing will be described below with reference to the flowchart of FIG. 5.

In step S40, the road surface information correction unit 16 performs road surface information correction processing. The road surface information correction processing presents road surface information indicating the presence of an obstacle on the road surface around the own vehicle to the occupant of the own vehicle on the basis of the road surface environment around the own vehicle recognized in step S10. After receiving instruction from the occupant of the own vehicle to correct the road surface information, the road surface information correction processing corrects the road surface information in accordance with the instruction, and invalidates the obstacle. Note that details of the road surface information correction processing will be described below with reference to the flowchart of FIG. 6.

In step S50, the parking route calculation unit 14 performs parking route calculation processing. The parking route calculation processing uses the road surface information based on the road surface environment around the own vehicle recognized in step S10 and calculates a parking route for moving the own vehicle to the parking position determined in step S30. At this time, in a case where the road surface information has been corrected in step S40, the parking route is calculated in accordance with the corrected road surface information. Note that details of the parking route calculation processing will be described below with reference to the flowchart of FIG. 7.

In step S60, the parking vehicle control unit 15 performs parking vehicle control processing. The parking vehicle control processing performs vehicle control for moving the own vehicle to the parking position determined in step S30 in accordance with the parking route calculated in step S50. Note that details of the parking vehicle control processing will be described below with reference to the flowchart of FIG. 8.

Figure 4:
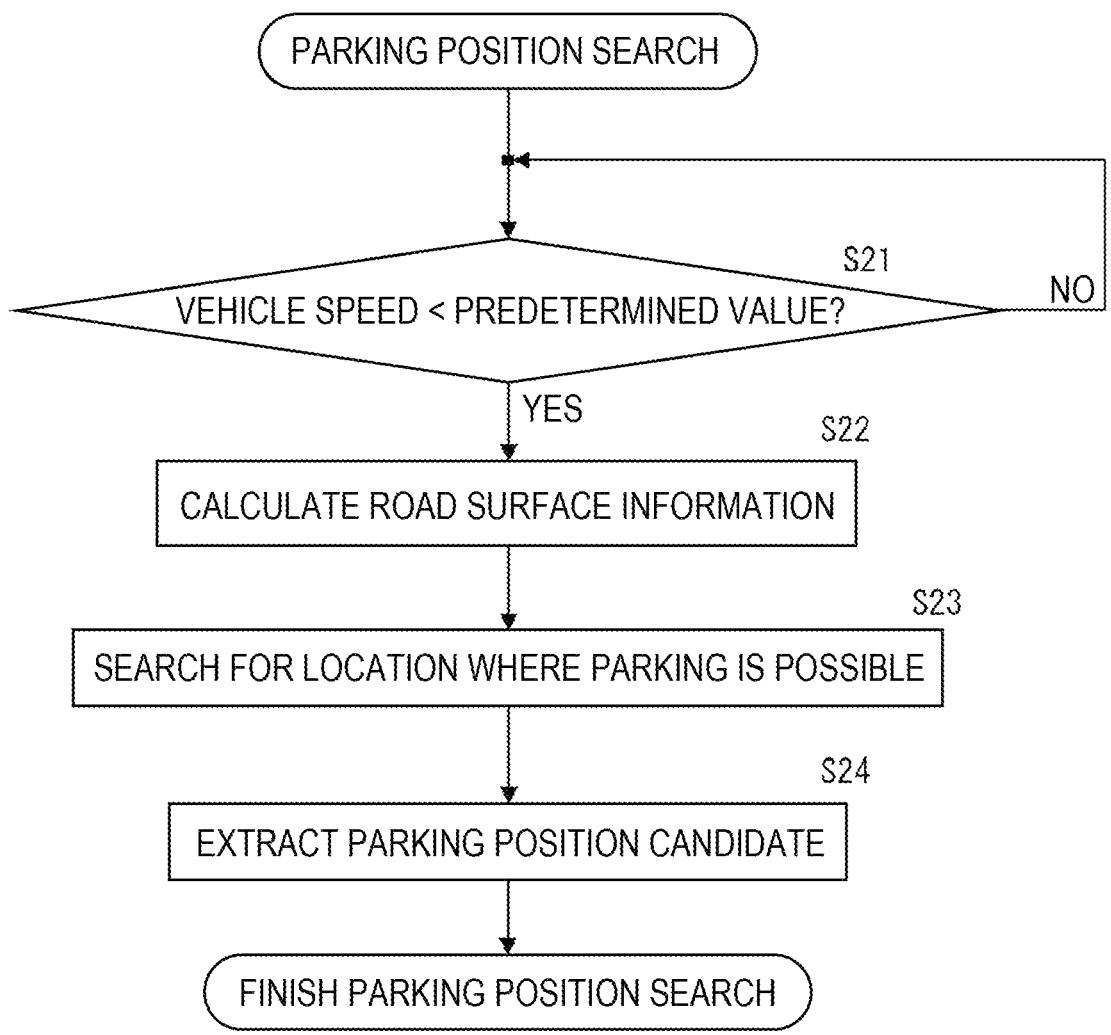
FIG. 4 is a flowchart of parking position search processing.

Subsequently, details of individual processing of steps S20 to S60 of FIG. 3 will be described. First, details of the parking position search processing to be executed in step S20 of FIG. 3 will be described. FIG. 4 is a flowchart of the parking position search processing.

In step S21, the parking position search unit 12 determines whether the vehicle speed, that is, the traveling speed of the own vehicle, is less than a predetermined value, for example, 10 km/h. When it is determined, as a result, that the vehicle speed is less than the predetermined value, it is judged that the own vehicle can start parking, and the processing proceeds to step S22 to start searching for the parking position. In contrast, in a case where the vehicle speed is a predetermined value or more, the processing waits until the speed falls below the predetermined value.

In step S22, the parking position search unit 12 calculates road surface information around the own vehicle on the basis of the result of the external environment recognition processing performed in step S10 of FIG. 3. This road surface information includes information such as the presence or absence of a parking frame line or an obstacle on the road surface around the own vehicle, the position or shape of the parking frame line if any, and the position, two-dimensional shape, three-dimensional shape of the obstacle, if any. Note that the position and the shape of the parking frame line, and the two-dimensional position and the shape of the obstacle can be obtained by a sensor that performs two-dimensional detection such as the camera 41 in FIG. 2, for example, out of the external environment sensors 4. In contrast, the three-dimensional position and shape of the obstacle can be obtained by a sensor that performs three-dimensional detection such as the sonar 42 in FIG. 2, for example, out of the external environment sensor 4.

In step S23, the parking position search unit 12 searches for a location at which the own vehicle can park on the basis of the road surface information calculated in step S22. For example, a location enclosed by a parking frame line or a space sandwiched by other vehicles is searched as a location at which the own vehicle can park.

In step S24, the parking position search unit 12 extracts parking position candidates of the own vehicle from among the locations where parking is possible searched in step S23. For example, in a case where locations in which other vehicles are already parked, or locations not having enough space for the size of the own vehicle or the like are included in the parking locations that have been found in the search, locations obtained by excluding the above are extracted as parking position candidates. In addition, in a case where there is a location that is more difficult to park in compared to other locations where parking is possible, such as distant from the own vehicle, the parking position candidate may be extracted by excluding this location. After extracting the parking position candidate in step S24, the parking position search unit 12 finishes the parking position search processing of FIG. 4.

Figure 5:
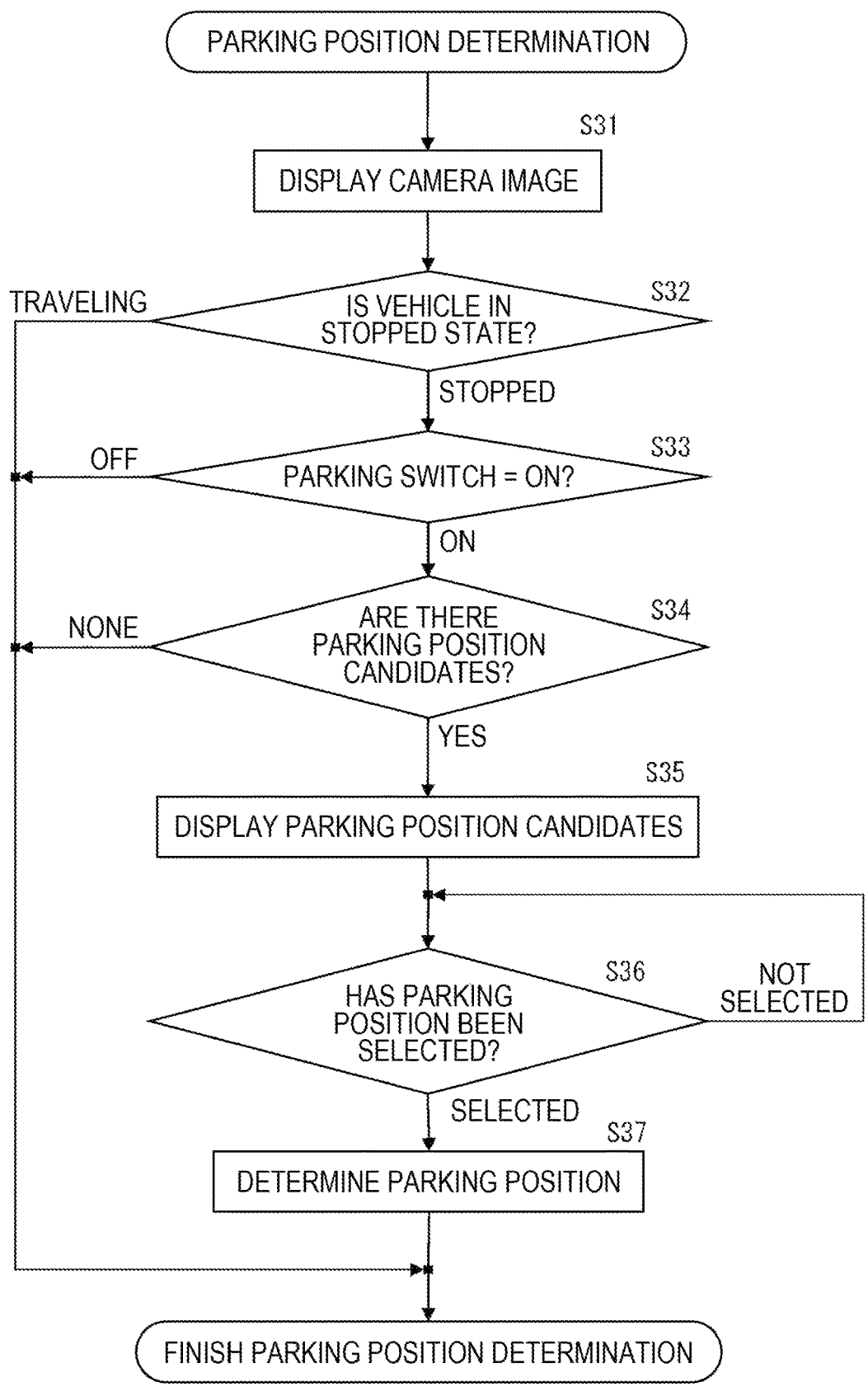
FIG. 5 is a flowchart of parking position determination processing.

Next, details of the parking position determination processing executed in step S30 of FIG. 3 will be described. FIG. 5 is a flowchart of the parking position determination processing.

In step S31, the parking position determination unit 13 uses the display control unit 17 to display a camera image of the surroundings of the own vehicle, on the HMI device 2. The camera image displayed here is, for example, an image captured using the camera 41 included in the external environment sensor 4. At this time, the camera image may be displayed after performing processing, for example, predetermined viewpoint conversion processing on the camera image.

Figure 9:
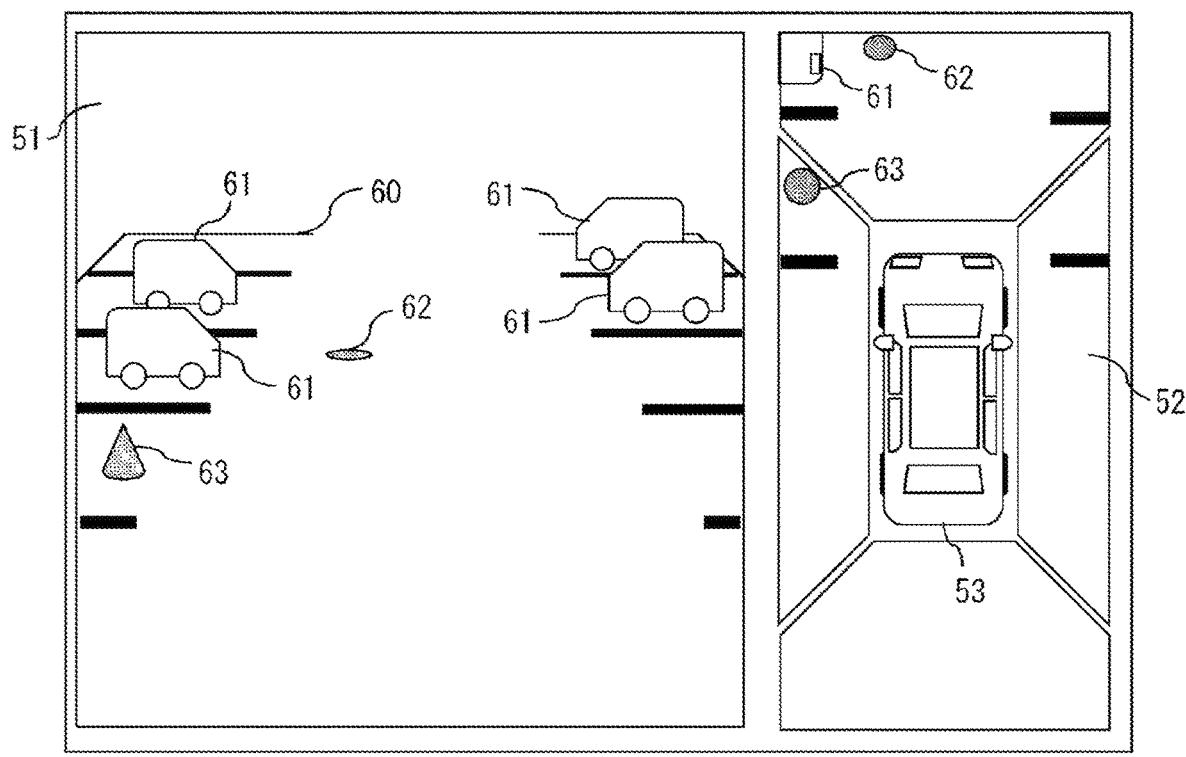
FIG. 9 is a view illustrating an example of a camera image display screen.

FIG. 9 is a view illustrating an example of a camera image display screen displayed on the HMI device 2 in step S31. The camera image display screen of FIG. 9 includes a camera image 51 displayed without processing the image captured by the camera 41 in front of the own vehicle and an upper viewpoint image 52 obtained by converting and combining images captured by each of the cameras 41 provided on the front, rear, left and right of the own vehicle to indicate the surrounding situation of the vehicle as viewed from above. These images include images of a parking frame line 60, another vehicle 61, a two-dimensional object 62, a three-dimensional object 63. The two-dimensional object 62 is a two-dimensionally shaped object which exists on the road surface and is recognized separately from the road surface, and corresponds to, for example, a manhole, a pool, a grating, various paints drawn on the road surface, or the like. In contrast, the three-dimensional object 63 is a three-dimensionally shaped object that can be an obstacle when the own vehicle is parked, and corresponds to, for example, a road cone, a fence, a pole, a car stop or the like. Note that an own vehicle image 53 indicating the position of the own vehicle as a reference position is displayed at the center of the upper viewpoint image 52.

Returning to the explanation of FIG. 5, in step S32, the parking position determination unit 13 determines whether the own vehicle is in a stopped state. When it is determined, as a result, that the own vehicle is in the stopped state, that is, when the vehicle speed is approximately zero, the processing proceeds to step S33. In a case where the own vehicle is not in the stopped state but in the traveling state, the parking position determination processing of FIG. 5 is finished. In this case, since the parking position is not determined, the processing after step S40 of FIG. 3 is not to be executed.

In step S33, the parking position determination unit 13 determines whether the parking switch 3 is on. When it is determined, as a result, that the parking switch 3 is on, the processing proceeds to step S34. When it is determined that the parking switch 3 is off, the parking position determination processing of FIG. 5 is finished. Also in this case, since the parking position is not determined, the processing after step S40 of FIG. 3 is not to be executed.

In step S34, the parking position determination unit 13 determines whether a parking position candidate has been extracted in step S24 of FIG. 4. When it is determined, as a result, that at least one parking position candidate has been extracted, the processing proceeds to step S35. When no parking position candidate has been extracted, the parking position determination processing of FIG. 5 is finished. Also in this case, since the parking position is not determined, the processing after step S40 of FIG. 3 is not to be executed.

In step S35, the parking position determination unit 13 uses the display control unit 17 to display the parking position candidate extracted by the parking position search unit 12 in step S24 on the camera image displayed in step S31.

Figure 10:
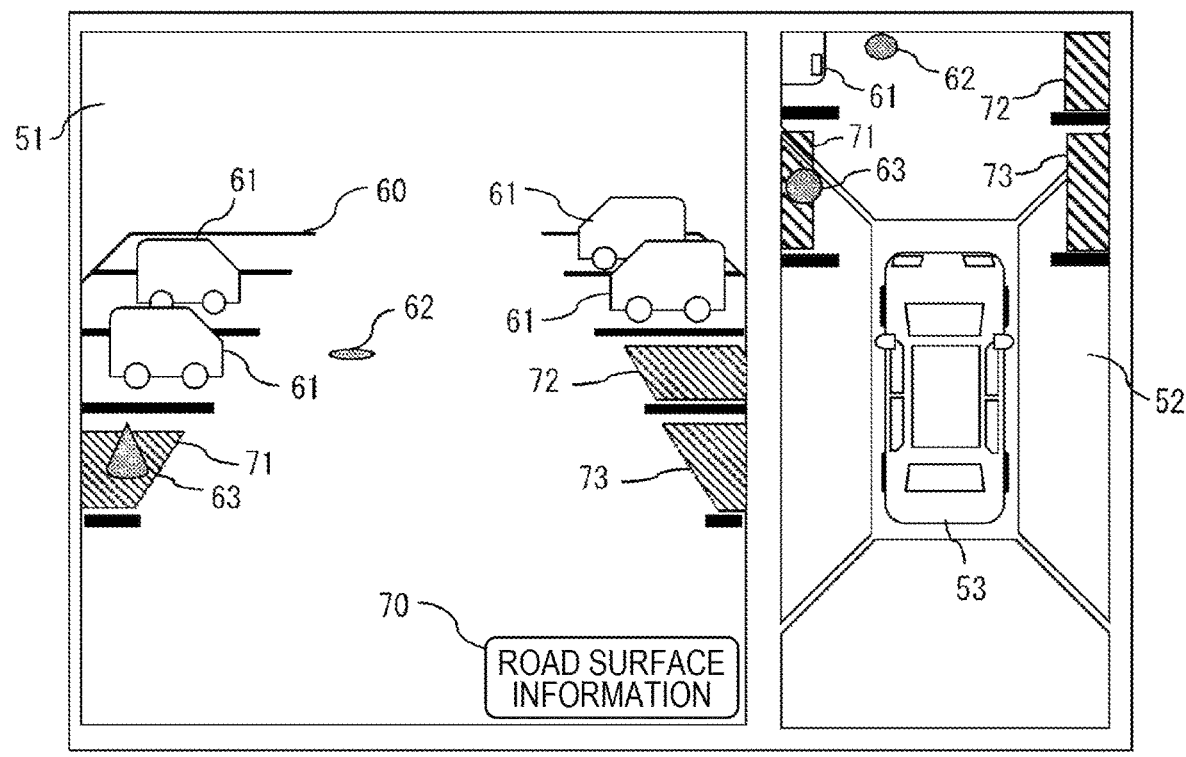
FIG. 10 is a view illustrating an example of a parking position candidate display screen.

FIG. 10 is a view illustrating an example of the parking position candidate display screen displayed on the HMI device 2 in step S35. In the parking position candidate display screen of FIG. 10, parking position candidates 71, 72, and 73 are further displayed in the camera image 51 and the upper viewpoint image 52 similar to FIG. 9. Although parking position candidates 71, 72, and 73 are illustrated as hatched regions in FIG. 10, any display form may be used as long as the occupant can easily distinguish the positions from other portions. The camera image 51 further includes a display of a road surface information button 70 for switching to a road surface information screen. Specific operation caused by selection of the road surface information button 70 by the occupant of the own vehicle will be described below in the flowchart of the road surface information correction processing of FIG. 6.

Returning to the explanation of FIG. 5, in step S36, the parking position determination unit 13 determines whether any of the parking position candidates displayed in step S35 has been selected by the occupant of the own vehicle. When it is determined, as a result, that the occupant has selected one of the parking position candidates by the operation of HMI device 2, the processing proceeds to step S37. In contrast, when the occupant has not selected any parking position candidate, the processing waits until a parking position candidate is selected.

In step S37, the parking position determination unit 13 determines the parking position candidate selected in step S36 as the parking position at which the own vehicle to be parked. After determination of the parking position in step S37, the parking position determination unit 13 finishes the parking position determination processing of FIG. 5.

Figure 6:
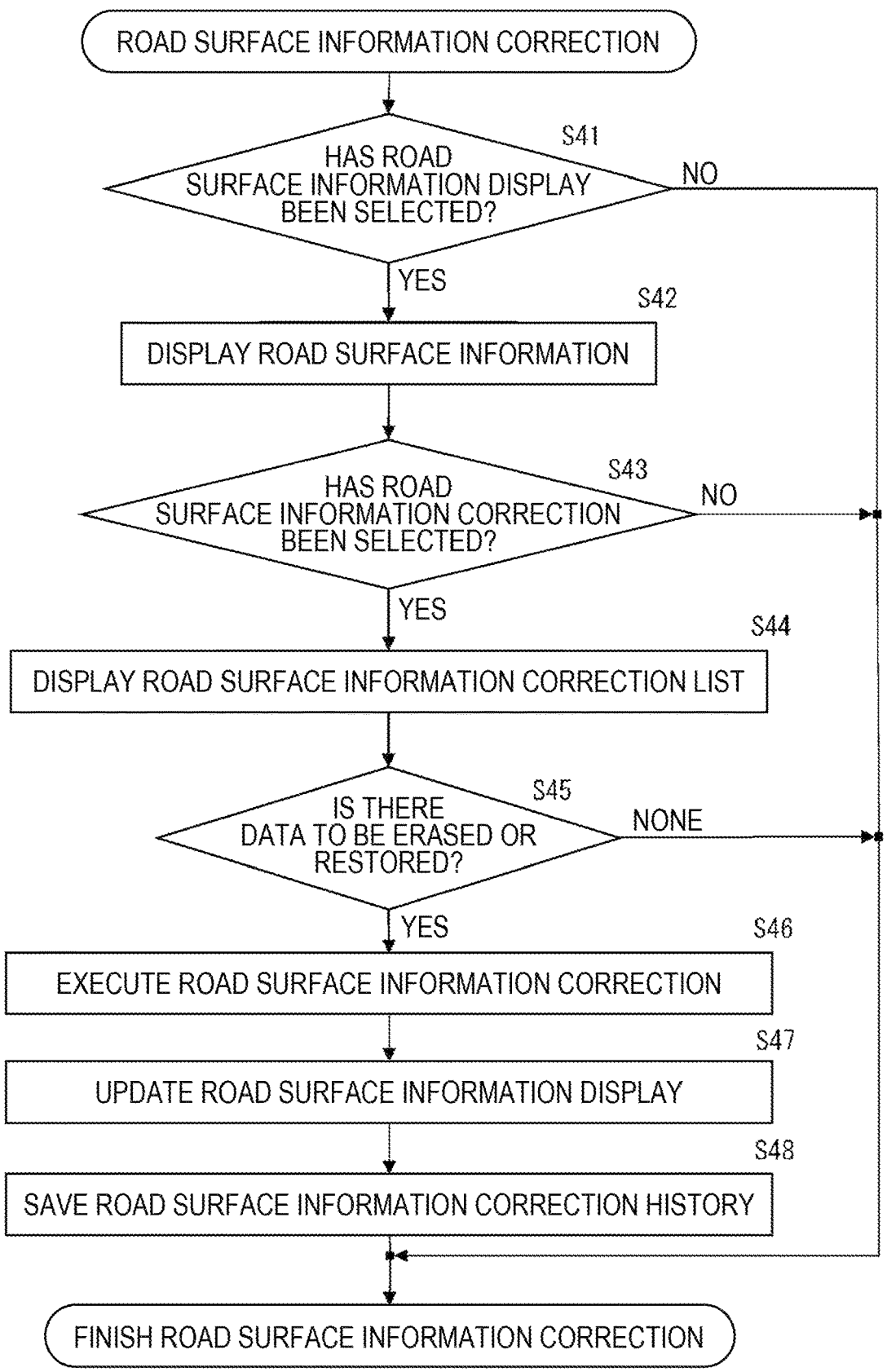
FIG. 6 is a flowchart of road surface information correction processing.

Next, details of the road surface information correction processing executed in step S40 of FIG. 3 will be described. FIG. 6 is a flowchart of the road surface information correction processing.

In step S41, the road surface information correction unit 16 determines whether the road surface information display has been selected by the occupant of the own vehicle. This determination is performed, for example, on the basis of whether there is input operation of selecting the road surface information button 70 on the screen illustrated in FIG. 10. That is, in a case where the occupant has performed operation of selecting the road surface information button 70 on the HMI device 2, it is judged that the selection of the road surface information display has been performed, and the processing proceeds to step S42. In a case where the operation has not been performed, the road surface information correction processing of FIG. 6 is finished. In this case, the road surface information calculated in step S22 of FIG. 4 is used as it is without being corrected for calculation of the parking route.

In step S42, the road surface information correction unit 16 causes the HMI device 2 to display the road surface information using the display control unit 17 so as to present the road surface information to the occupant of the own vehicle. The road surface information includes information regarding the two-dimensional object 62 and the three-dimensional object 63 which are present on the road surface around the own vehicle and have been recognized as obstacles in step S10 of FIG. 3.

Figure 11:
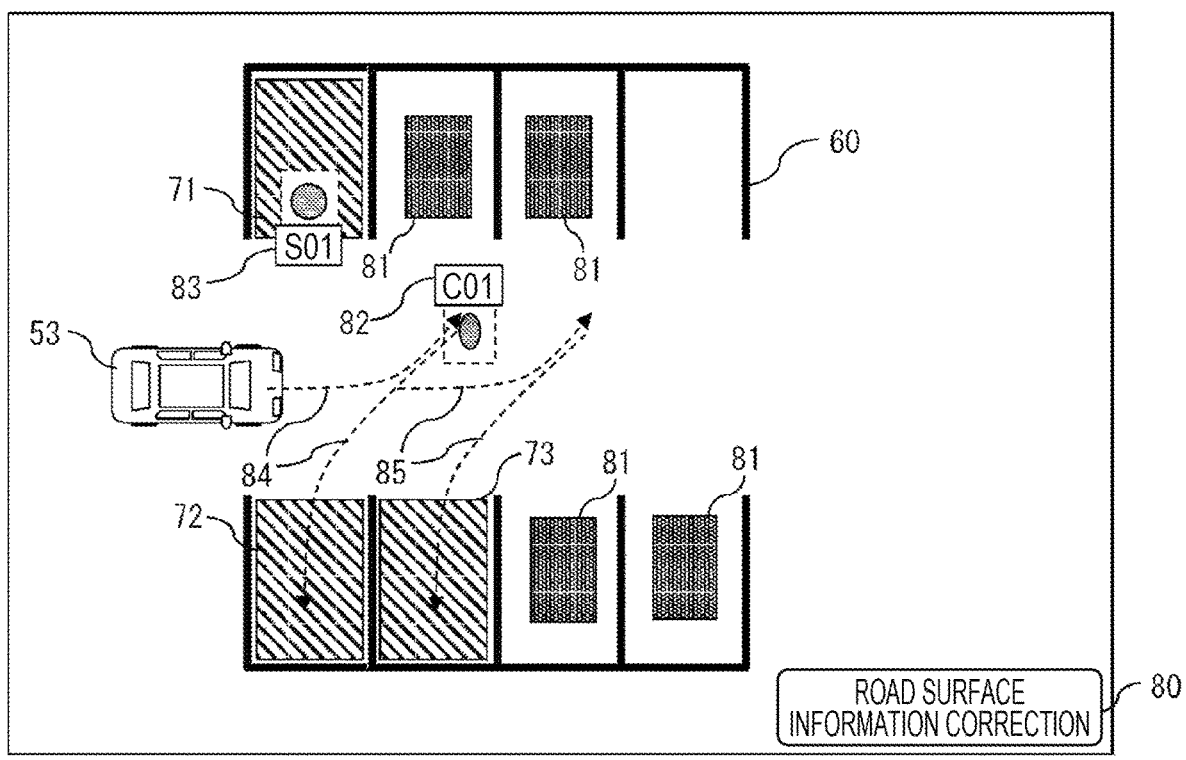
FIG. 11 is a view illustrating an example of a road surface information screen.

FIG. 11 is a view illustrating an example of the road surface information screen displayed on the HMI device 2 in step S42. The road surface information screen of FIG. 11 displays the own vehicle image 53 indicating the position of the own vehicle, the parking frame line 60, and the parking position candidates 71, 72, and 73. In addition, another vehicle mark 81 is displayed to indicate that the own vehicle cannot park at a parking spot that is not a parking position candidate, that is, a parking spot in which another vehicle 61 was present in the camera image display screen of FIG. 9. Furthermore, obstacle marks 82 and 83 indicating obstacles are displayed at positions respectively corresponding to the locations where the two-dimensional object 62 and the three-dimensional object 63 were present on the camera image display screen of FIG. 9. Each of these obstacle marks has identification ID of "C01" and "S01", respectively. In these identification IDs, "C" indicates a two-dimensionally shaped object, that is, an object detected by the sensor (for example, the camera 41) capable of two-dimensional detection of the surroundings of the own vehicle but not detected by the sensor (for example, sonar 42) capable of three-dimensional detection of the surroundings of the own vehicle, out of the external environment sensors 4. In contrast, "S" indicates a three-dimensionally shaped object, that is, an object detected by the sensor (for example, sonar 42) capable of three-dimensional detection of the surroundings of the own vehicle, out of the external environment sensors 4.

Here is an exemplary case where the parking position candidate 71 is determined as the parking position in step S37 of FIG. 5. In this case, the parking route for parking the own vehicle at the parking position 71 would interfere with the obstacle corresponding to the obstacle mark 83 with the identification ID=S01, that is, the three-dimensional object 63. Therefore, the parking assistance device 1 judges that parking at the parking position 71 is not possible, and instructs the occupant to either stop the subsequent processing or select another parking position candidate. This makes it possible to prevent the own vehicle from colliding with the three-dimensional object 63 which is an obstacle.

Moreover, here is another exemplary case where the parking position candidate 72 or 73 is determined as the parking position in step S37 of FIG. 5. In this case, the parking routes 84 and 85 for respectively parking the own vehicle at the parking positions 72 and 73 would interfere with the obstacle corresponding to the obstacle mark 82 with the identification ID=C01, that is, the two-dimensional object 62. Therefore, similarly to the case of the parking position 71, the parking assistance device 1 judges that parking at the parking position 72 or 73 is not possible, and instructs the occupant to either stop the subsequent processing or select another parking position candidate.

However, as described above, the two-dimensional object 62 is a manhole, a puddle or the like existing on the road surface, and thus, would not be an obstacle at the time of parking. That is, the obstacle mark 82 indicates road surface information by which the two-dimensional object 62 which is not actually an obstacle has been falsely recognized as an obstacle. In such a case, even though nothing intervenes in parking at the parking position 72 or 73 for the occupant of the own vehicle, the parking assistance device 1 will not give parking assistance to these positions with no apparent cause. This might greatly impair the practicability of the parking assistance device 1, leading to the feeling on the occupant of discontent or suspect of malfunction in the parking assistance device 1.

To avoid this, the present embodiment displays a road surface information correction button 80 on the road surface information screen of FIG. 11 so as to let the occupant of the own vehicle to correct the road surface information to enable parking at the parking position 72 or 73. The occupant of the own vehicle can select the road surface information correction button 80 to correct the road surface information so as to invalidate the falsely recognized obstacle. For example, in a case where the two-dimensional object 62 has been falsely recognized as an obstacle, the road surface information is corrected to invalidate the two-dimensional object 62 recognized as the obstacle, suppressing judgement that the two-dimensional object 62 intervenes in parking at the parking position 72 or 73. Specific operation in a case where the road surface information correction button 80 is operated by the occupant will be described in step S43.

Figure 12:
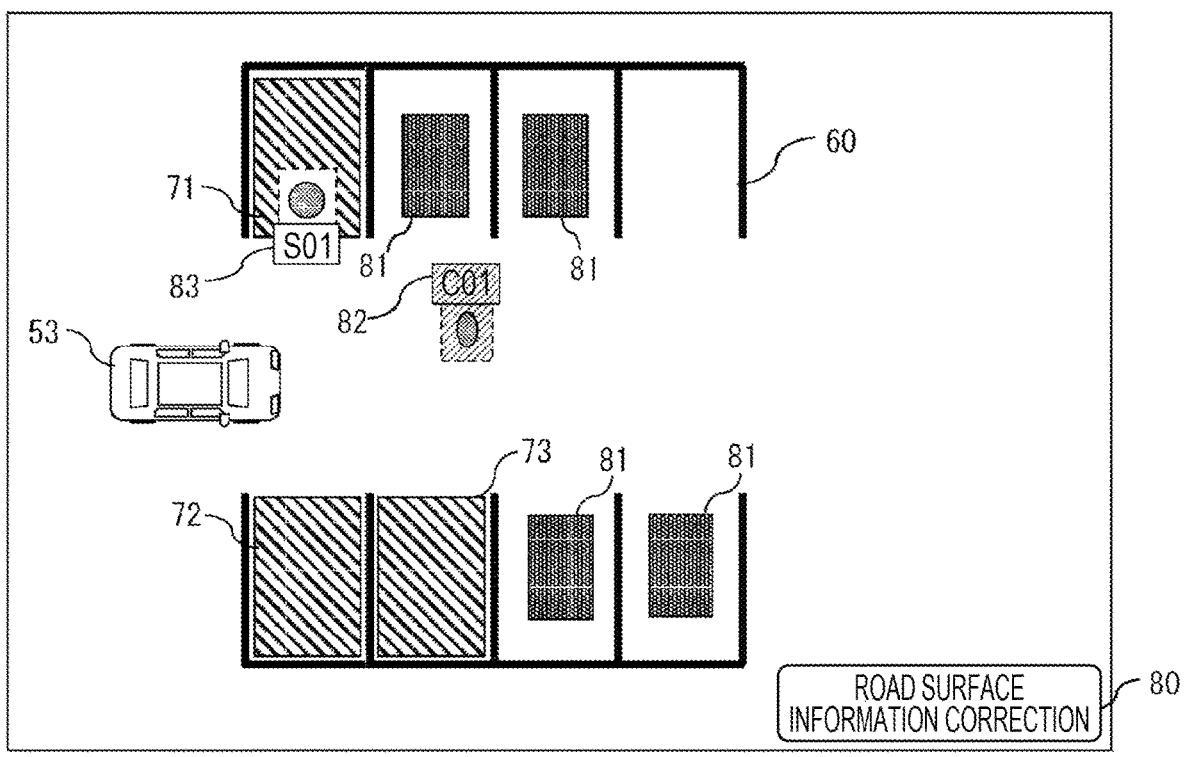
FIG. 12 is a view illustrating an example of a road surface information screen after correction.

FIG. 12 is a view illustrating an example of the corrected road surface information screen displayed on the HMI device 2 after the road surface information is corrected. In the screen of FIG. 12, the obstacle mark 82 indicating the invalidated two-dimensional object 62 is grayed out in display. This clearly indicates that the road surface information of the two-dimensional object 62 has been corrected. Note that display forms other than grayed-out form may be used as long as the fact that the road surface information has been corrected is clearly indicated.

Returning to the explanation of FIG. 6, in step S43, the road surface information correction unit 16 determines whether the road surface information correction has been selected by the occupant of the own vehicle. This determination is performed, for example, on the basis of whether there is an operation input of selecting the road surface information correction button 80 on the screen illustrated in FIG. 11. That is, in a case where the occupant has performed operation of selecting the road surface information correction button 80 on the HMI device 2, it is judged the selection of the road surface information display is performed, and the processing proceeds to step S44. In a case where the operation has not been performed, the road surface information correction processing of FIG. 6 is finished. Also in this case, the road surface information calculated in step S22 of FIG. 4 is used as it is without being corrected for calculation of the parking route.

In step S44, the road surface information correction unit 16 causes the HMI device 2 to display the road surface information correction list using the display control unit 17 so as to prompt the occupant of the own vehicle to correct road surface information. Here, a road surface information correction screen listing the two-dimensional object 62 and the three-dimensional object 63, which are present on the road surface around the own vehicle and recognized as obstacles in step S10 of FIG. 3, is displayed on the HMI device 2 so as to display the road surface information correction list.

Figure 13:
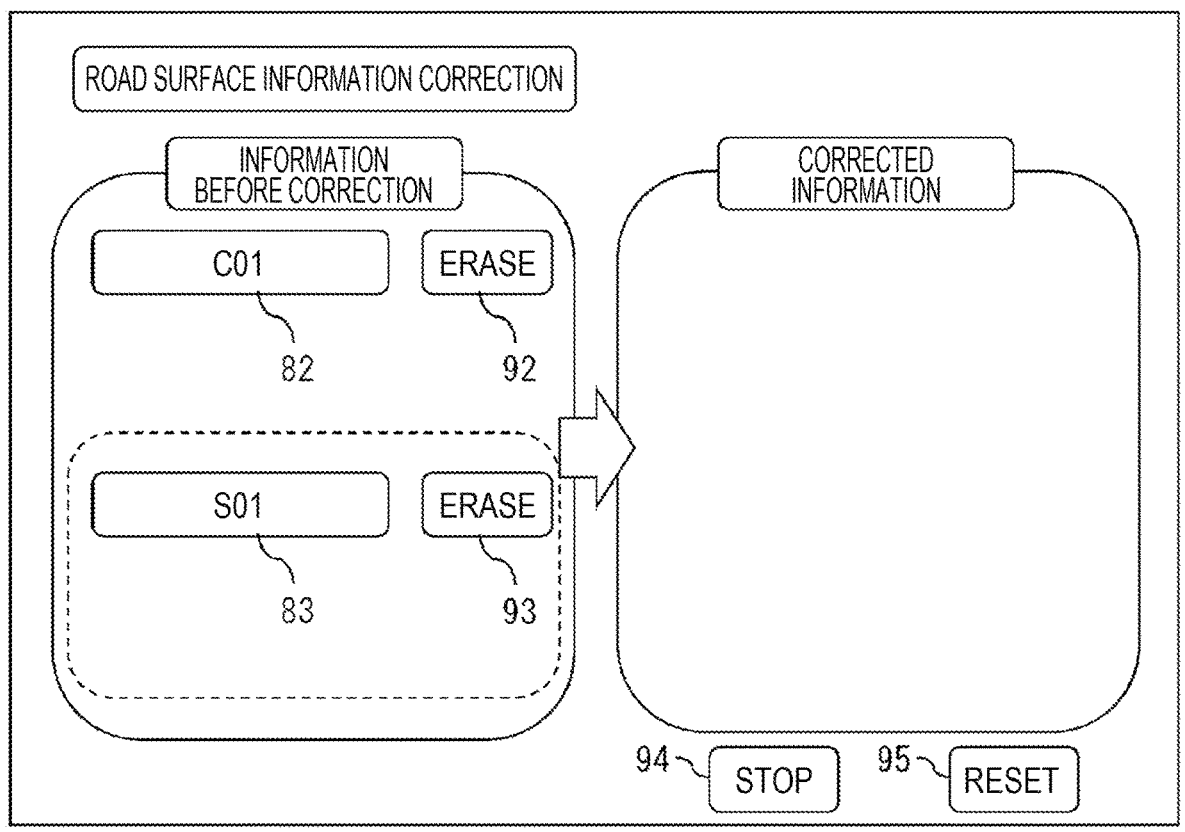
FIG. 13 is a view illustrating an example of a road surface information correction screen.

FIG. 13 is a view illustrating an example of the road surface information correction screen displayed on the HMI device 2 in step S44. The road surface information correction screen of FIG. 13 displays a list of the obstacle marks 82 and 83 displayed on the road surface information screen of FIG. 11. In order to make it possible to identify which obstacle corresponds to each of these obstacle marks, the above-described identification IDs "C01" and "S01" are individually denoted, and erase buttons 92 and 93, which are operation buttons to erase the individual obstacles from the road surface information, are attached respectively. In addition, the road surface information correction screen also displays a stop button 94 being an operation button to stop correction of the road surface information and return to the road surface information screen, and a reset button 95 to reset the corrected road surface information to the state before correction.

Figure 14:
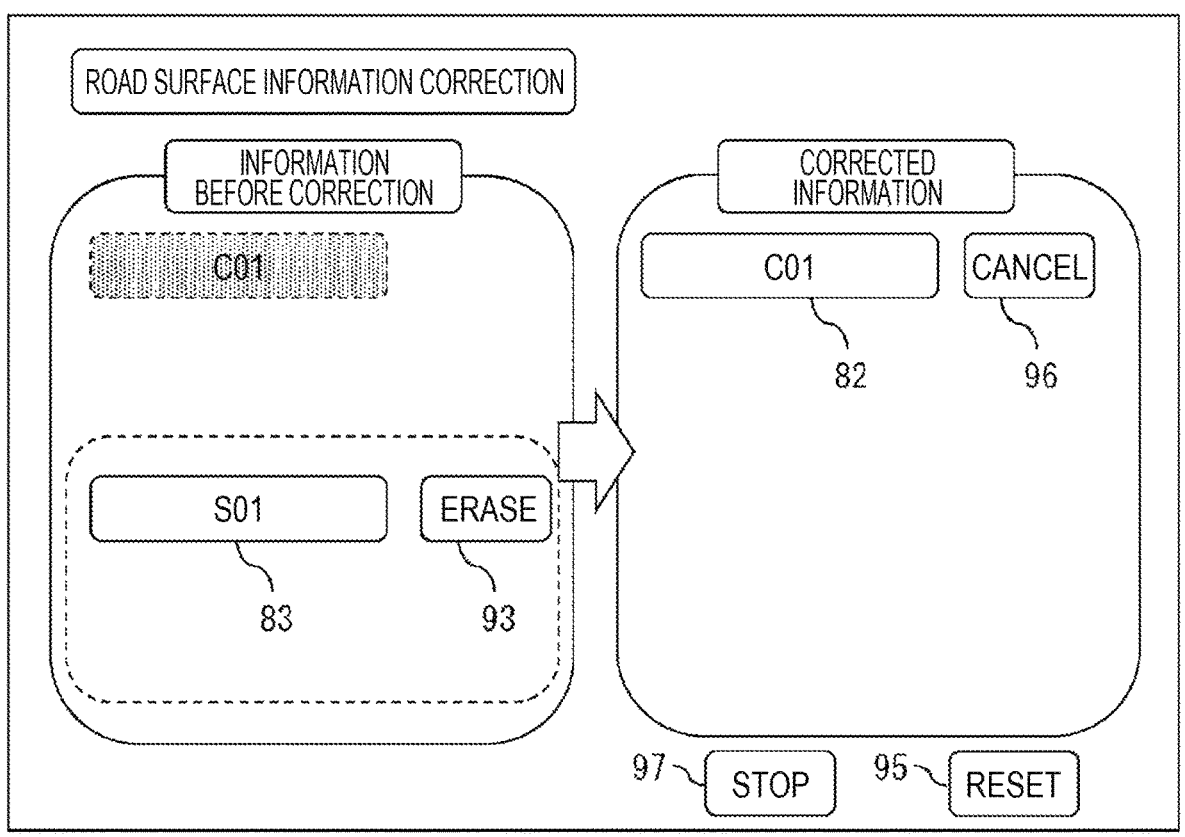
FIG. 14 is a view illustrating an example of a road surface information correction screen.

When the occupant selects the erase button 92 on the screen of FIG. 13, the screen is switched to the screen of FIG. 14. In the screen of FIG. 14, the obstacle mark 82 has moved from the "information before correction" frame on the left side of the screen to the "corrected information" frame on the right side of the screen. This indicates that the obstacle corresponding to the obstacle mark 82, namely, the two-dimensional object 62 falsely recognized as an obstacle, is the road surface information as a correction target. Note that the obstacle mark 82 is displayed in a grayed-out state even within the frame of "information before correction", indicating the state before movement.

In the screen of FIG. 14, the obstacle mark 82 is provided with a cancel button 96 which is an operation button for canceling the designation of the correction target for restoration. When the occupant selects the cancel button 96, the obstacle mark 82 moves back into the frame of "information before correction" and returns to the screen of FIG. 13. The screen of FIG. 14 also displays an OK button 97 being an operation button for reconfirming the correction content of the road surface information, in place of the stop button 94 of FIG. 13. When the occupant selects the OK button 97, the road surface information is corrected such that the obstacle corresponding to the obstacle mark 82 in the "corrected information" frame is invalidated. With this configuration, the two-dimensional object 62 falsely recognized as an obstacle is excluded from the obstacle in the road surface information, enabling parking assistance to the parking position 72 or 73.

Figure 15:
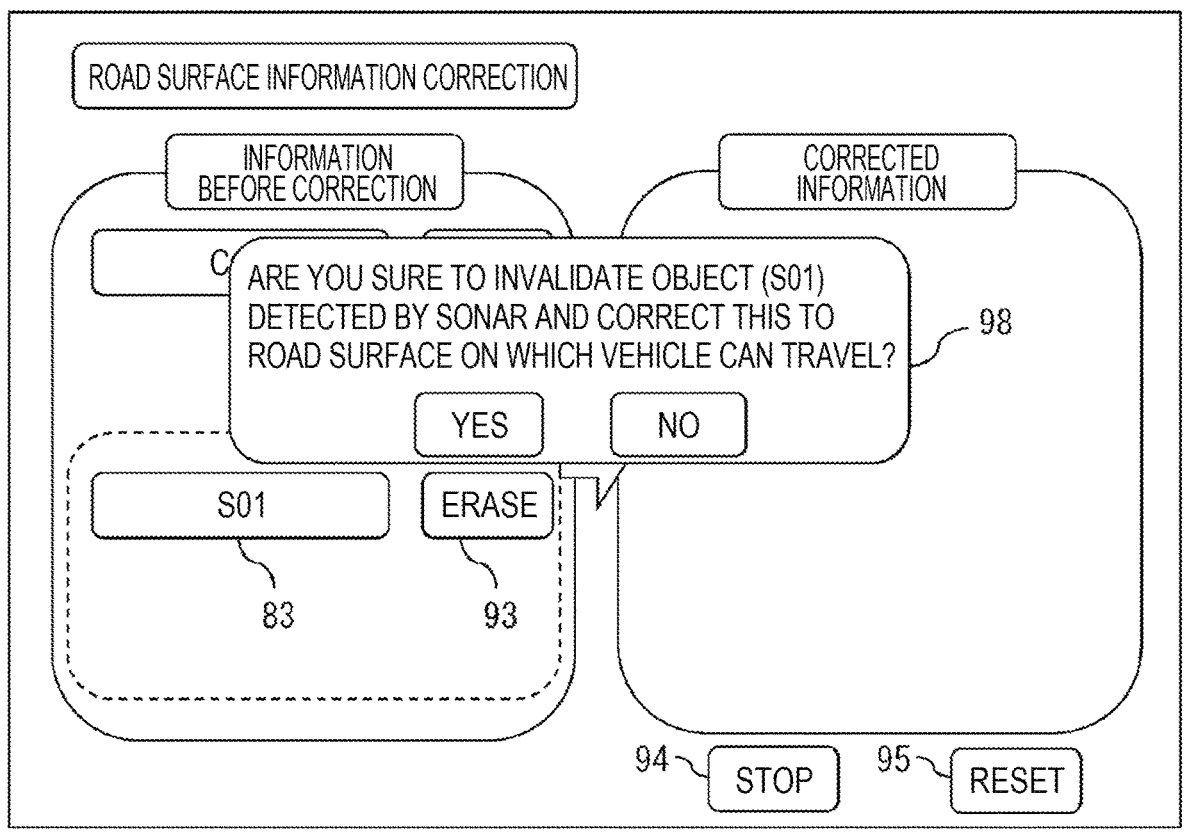
FIG. 15 is a view illustrating an example of a road surface information correction screen.

In contrast, when the occupant selects the erase button 93 on the screen of FIG. 13, the screen is switched to the screen of FIG. 15. In the screen of FIG. 15, the obstacle mark 83 is not moved from the "information before correction" frame on the left side of the screen to the "corrected information" frame on the right side of the screen. Instead, the screen displays a notification window 98 to notify that the obstacle corresponding to the obstacle mark 83 is the object detected by the sonar 42. When "NO" is selected in the notification window 98, the correction of the road surface information will not be performed, and the processing returns to the screen of FIG. 13.

Figure 16:
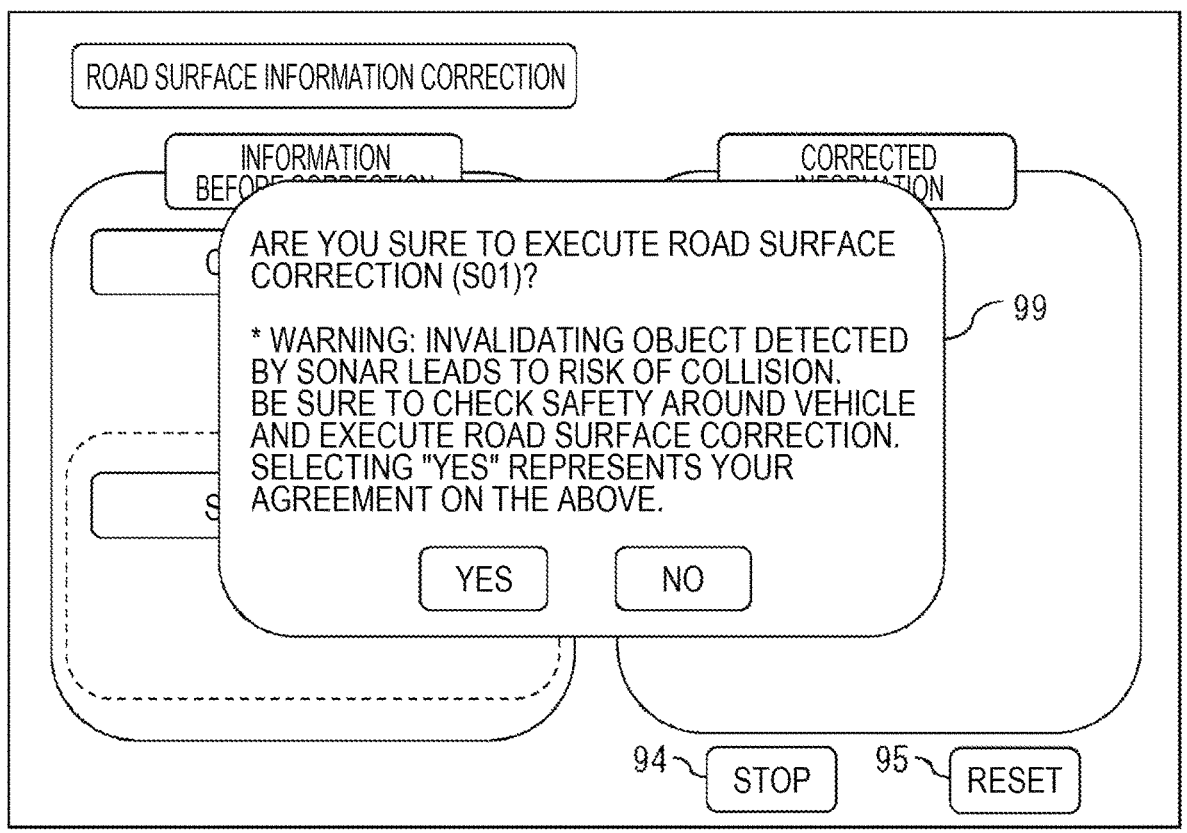
FIG. 16 is a view illustrating an example of a road surface information correction screen.

When "Yes" is selected in the notification window 98, the processing is switched to the screen of FIG. 16. In the screen of FIG. 16, an alerting window 99 is displayed in place of the notification window 98. The alerting window 99 allows the occupant to recognize the possible danger caused by invalidating the obstacle corresponding to the obstacle mark 83 by correcting the road surface information, thereby alerting the occupant. When "Yes" is selected in the alerting window 99, the obstacle mark 83 moves from the "before correction" frame on the left of the screen into the "corrected information" frame on the right of the screen, enabling correction of the road surface information. In contrast, when "No" is selected, the correction of the road surface information is not performed, and the processing returns to the screen of FIG. 13.

Unlike the case of the two-dimensional object 62 described above, the three-dimensional object 63 being an obstacle corresponding to the obstacle mark 83 is an object that has been detected by the sonar 42 being a sensor capable of three-dimensional detection of the surroundings of the own vehicle. Therefore, it is highly possible that the three-dimensional object 63 is actually an obstacle. Therefore, in the present embodiment, as described in FIGS. 15 and 16, the notification window 98 or the alerting window 99 are displayed without moving the obstacle mark 83 to the frame of "corrected information" even when the erase button 93 has been selected. With this configuration, the correction of the road surface information is temporarily prohibited for the three-dimensional object 63 so as to ensure the safety at the time of parking assistance. However, there is a possibility of occurrence of false detection even with the sonar 42. Therefore, the correction of the road surface information is not completely prohibited, and the prohibition of correction of road surface information for the three-dimensional object 63 will be cancelled after confirmation of the occupant by the notification window 98 and the alerting window 99. This makes it possible to correct the road surface information also for the three-dimensional object 63, leading to achievement of both practicality and safety.

Note that, in a case where the erase button 93 is selected, it is also allowable to display one of the notification window 98 illustrated in FIG. 15 or the alerting window 99 illustrated in FIG. 16. In this case, it is allowable to move an obstacle list 91 into the frame of "corrected information" to permit correction of the road surface information after confirmation from the occupant. In addition, the configuration may be enhanced in consideration of more safety by permitting the correction of the road surface information after the authentication using a password.

Returning to the description of FIG. 6. In step S45, the road surface information correction unit 16 determines whether there is data of an obstacle designated as a target to be erased or restored in the road surface information correction list displayed in step S44. As described with FIGS. 13 to 16, the erase button 92 or 93 is selected on the road surface information correction screen of the HMI device 2 to allow the obstacle mark 82 or 83 to be newly moved into the "corrected information" frame. In a case where the OK button 97 is selected in this state, it is determined that there is data of an obstacle designated as a target to be erased, and the processing proceeds to step S46. In addition, selecting the cancel button 96 or the reset button 95 returns the obstacle mark 82 or 83 which has been moved to the "corrected information" frame to the "information before correction" frame. In a case where the reset button 95 is selected in the state, it is determined that there is data of an obstacle designated as a target to be restored, and the processing proceeds to step S46. Meanwhile, in a case where none of the above is present, it is determined that there is no data of the obstacle designated as the target to be erased or restored, and the road surface information correction processing of FIG. 6 is finished.

In step S46, the road surface information correction unit 16 executes correction of road surface information. Here, the road surface information displayed in step S42 is partially rewritten and corrected so that the information indicating the obstacle designated as the target to be erased or restored at the time of determination in step S45 is invalidated or validated. With this operation, the road surface information is corrected for the obstacle selected by the occupant on the road surface information correction screen displayed in step S44, and the obstacle is invalidated or the obstacle once invalidated is re-validated.

In step S47, the road surface information correction unit 16 updates the display of the road surface information performed in step S42 in accordance with the road surface information corrected in step S46. With this operation, the corrected road surface information is reflected on the road surface information screen displayed on the HMI device 2, and the invalidated obstacle is displayed in a grayed-out form on the road surface information screen, or the re-validated obstacle is redisplayed in an original display form. As a result, for example, a screen as illustrated in FIG. 12 is displayed as a corrected road surface information screen. The invalidated obstacle may be completely erased from the road surface information screen without applying gray out display.

In step S48, the road surface information correction unit 16 saves and stores the correction history of the road surface information performed in step S46 in the storage unit 18. At this time, the correction history of the road surface information may be stored in combination with the position information of the own vehicle and the map information. In this manner, when parking assistance is performed at a location where the road surface information has been corrected in the past, it is possible to prompt the occupant to correct the road surface information on the basis of the correction history, or perform automatic correction. Furthermore, when the own vehicle is incapacitated by getting stuck or due to a collision at the time of parking assistance, the correction history of the road surface information can be used for the cause verification or the like. After saving the correction history of the road surface information in step S48, the road surface information correction unit 16 finishes the road surface information correction processing of FIG. 6.

Figure 7:
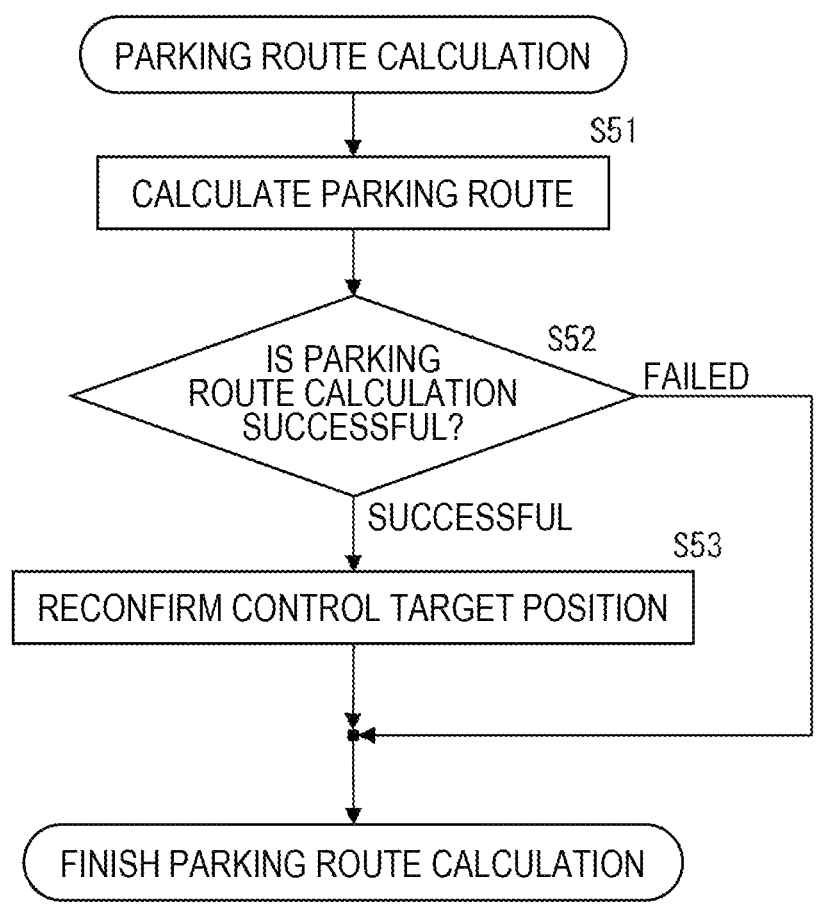
FIG. 7 is a flowchart of parking route calculation processing.

Next, details of the parking route calculation processing executed in step S50 of FIG. 3 will be described. FIG. 7 is a flowchart of the parking route calculation processing.

In step S51, the parking route calculation unit 14 calculates a parking route for parking the own vehicle at the parking position determined in step S37 in FIG. 5 on the basis of the road surface information calculated in step S22 in FIG. 4 and then corrected in step S46 in FIG. 6. Here, using a known algorithm, a route to be taken when the own vehicle is appropriately moved from the current position to the parking position is obtained to calculate the parking route. Note that in a case where the road surface information has not been corrected, the parking route may be calculated using the road surface information calculated in step S22 of FIG. 4 as it is.

In step S52, the parking route calculation unit 14 determines whether the calculation of the parking route is successful in step S51. After completion of calculation of the parking route, the processing proceeds to step S53. In contrast, in a case where the parking route calculation failed due to the presence of an obstacle between the current position and the parking position, or the like, the parking route calculation processing of FIG. 7 is finished. In this case, the occupant is notified that parking assistance is unavailable at the determined parking position, and the processing after step S60 in FIG. 3 is not to be executed.

In step S53, the parking route calculation unit 14 reconfirms the determined parking position as the control target position of the own vehicle. After step S53 is performed, the parking route calculation unit 14 finishes the parking route calculation processing of FIG. 7.

Figure 8:
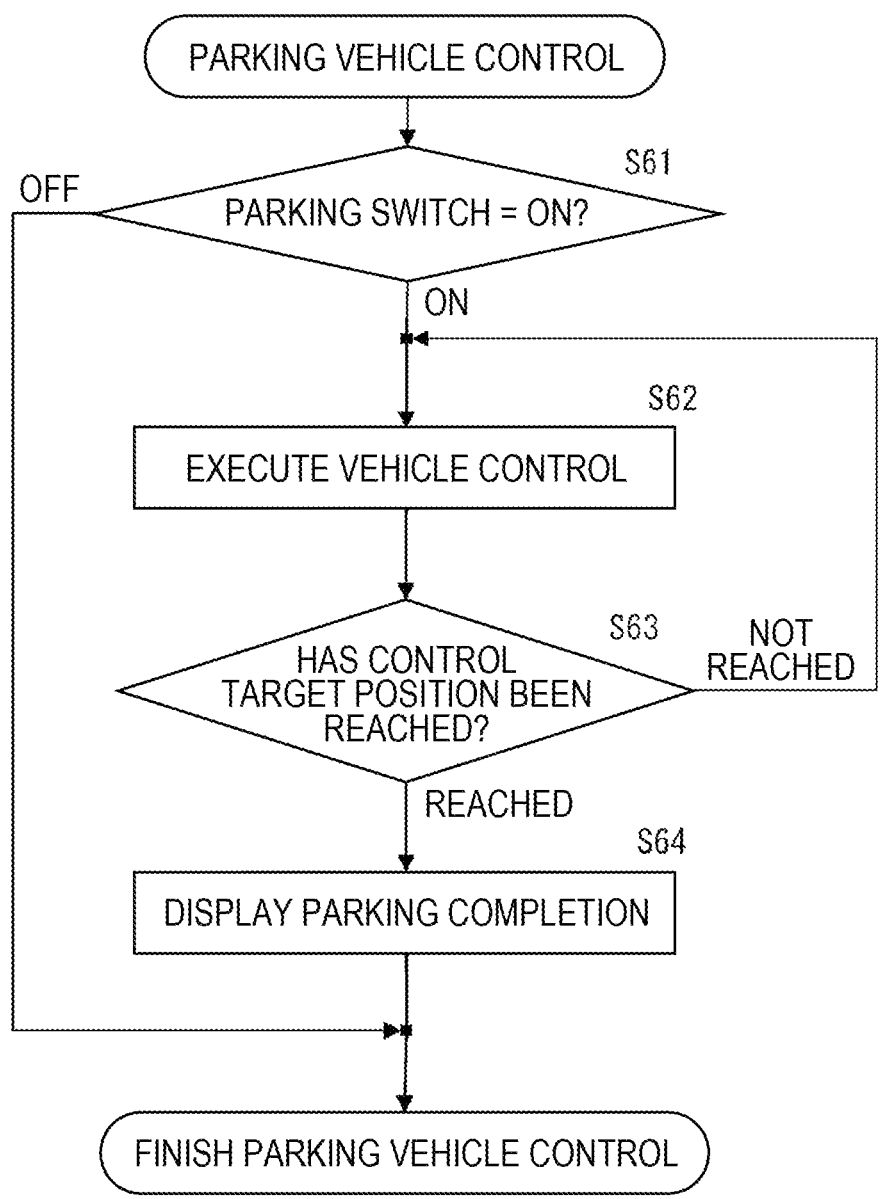
FIG. 8 is a flowchart of a parking vehicle control processing.

Next, details of the parking vehicle control processing executed in step S60 of FIG. 3 will be described. FIG. 8 is a flowchart of the parking vehicle control processing.

In step S61, the parking vehicle control unit 15 determines whether the parking switch 3 is on. When it is determined, as a result, that the parking switch 3 is on, the processing proceeds to step S62. When it is determined that the parking switch 3 is off, the parking vehicle control processing of FIG. 8 is finished. Note that it is also allowable to provide a plurality of parking switches 3 and use different switches as the determination target in the determination of step S33 of FIG. 5 and the determination of step S61 of FIG. 8. Alternatively, it is also allowable to permit a plurality of types of operation inputs using one parking switch 3, and use mutually different operation inputs as the determination target in the determination of step S33 in FIG. 5 and the determination in step S61 in FIG. 8.

In step S62, the parking vehicle control unit 15 executes vehicle control of the own vehicle on the basis of the parking route calculated in step S51 of FIG. 7. At this time, the parking vehicle control unit 15 controls each of the operation of the driving force control device 5, the braking force control device 6, the steering control device 7, and the shift control device 8 to move the own vehicle in accordance with the parking route. The control of the own vehicle by some devices, for example, the control of the engine by the driving force control device 5 and the control of the transmission by the shift control device 8 may be performed in accordance with the occupant's driving operation. In addition, parking assistance may be implemented by presenting a parking route to the occupant instead of moving the own vehicle.

In step S63, the parking vehicle control unit 15 determines whether the own vehicle has reached the control target position determined in step S53 of FIG. 7, that is, the parking position. When it is determined, as a result, that the control target position has not been reached, the vehicle control in step S62 is continued, and when it has been reached, the processing proceeds to step S64.

In step S64, the parking vehicle control unit 15 causes the display control unit 17 to display on the HMI device 2 a message indicating that the parking of the own vehicle has been completed. With this operation, the occupant of the own vehicle is notified of the fact that parking assistance by the parking assistance device 1 is successful and it is possible to leave the vehicle. In addition, notification may be issued with sound, etc. instead of display of the HMI device 2. After execution of step S64, the parking vehicle control unit 15 finishes the parking vehicle control processing of FIG. 8.

According to an embodiment of the present invention described above, the following effects can be obtained.

(1) The parking assistance device 1 includes the external environment recognition unit 11, the display control unit 17, the road surface information correction unit 16, and the parking route calculation unit 14. The external environment recognition unit 11 recognizes the road surface environment around the own vehicle on the basis of the detection information obtained by the external environment sensor 4 installed in the own vehicle. The display control unit 17 performs screen display using the HMI device 2 to present, to an occupant of the own vehicle, road surface information indicating the presence of an obstacle on the road surface around the own vehicle on the basis of the road surface environment recognized by the external environment recognition unit 11. The road surface information correction unit 16 corrects the road surface information and invalidates the obstacle. The parking route calculation unit 14 calculates a parking route for parking the own vehicle on the basis of the road surface information corrected by the road surface information correction unit 16. According to this configuration, it is possible to park the own vehicle at a location where parking is possible even when an obstacle is falsely detected.

(2) The external environment sensor 4 includes a sensor capable of two-dimensional detection of the periphery of the own vehicle, such as the camera 41, for example, and a sensor capable of three-dimensional detection of the periphery of the own vehicle, such as the sonar 42, for example. As described in FIG. 14, regarding the obstacle detected by the camera 41 and not detected by the sonar 42, for example, the two-dimensional object 62, the parking assistance device 1 determines that the obstacle mark 83 can be moved to the frame of "corrected information" and permits correction of the road information by the road surface information correction unit 16. In contrast, regarding the obstacle detected by the sonar 42, for example, the three-dimensional object 63, the parking assistance device 1 prohibits correction of the road information by the road surface information correction unit 16 by displaying the notification window 98 and the alerting window 99 as described with reference to FIGS. 15 and 16. With this configuration, it is possible to ensure the safety at the time of parking assistance.

(3) When the occupant of the own vehicle has performed predetermined operation, for example, operation of selecting "Yes" in the notification window 98 or the alerting window 99, the parking assistance device 1 cancels the prohibition of the correction of the road surface information to the three-dimensional object 63. With this configuration, the correction of the road surface information is possible also for the three-dimensional object 63 in consideration of the possibility of false detection by the sonar 42, making it possible, as a result, to achieve both practicality and safety.

(4) The parking assistance device 1 further includes the storage unit 18 that stores the correction history of the road surface information. With this configuration, it is possible to use history information to automatically correct the road surface information and investigate the cause of the incapacity in a case where the parking assistance is performed at the location where the road surface information was corrected in the past, or where the own vehicle is incapacitated.

(5) When a plurality of obstacles has been detected, the display control unit 17 causes the HMI device 2 to display a road surface information correction screen as illustrated in FIG. 13 listing the plurality of obstacles. The road surface information correction unit 16 corrects the road surface information for the obstacle selected by the occupant on the road surface information correction screen. With this configuration, when a plurality of obstacles has been detected, the obstacle to be the correction target of the road surface information can be easily selected by the occupant.

The embodiments and the various modifications described above are merely examples, and the present invention is not limited to these examples as long as the features of the invention are not impaired. While various embodiments and modifications have been described above, the present invention is not limited to these examples. Other aspects conceivable within the technical scope of the present invention are also included within the scope of the present invention.

REFERENCE SIGNS LIST 1 parking assistance device
2 HMI device
3 parking switch
4 external environment sensor
5 driving force control device
6 braking force control device
7 steering control device
8 shift control device
11 external environment recognition unit
12 parking position search unit
13 parking position determination unit
14 parking route calculation unit
15 parking vehicle control unit
16 road surface information correction unit
17 display control unit
18 storage unit

The invention claimed is:

1. A parking assistance device comprising:
at least one processor configured to:
recognize a road surface environment around a vehicle on the basis of information detected by an external environment sensor installed in the vehicle;
present, to an occupant of the vehicle, road surface information indicating a presence of an obstacle on a road surface around the vehicle on the basis of the recognized road surface environment;
correct the road surface information and invalidate the obstacle; and
calculate a parking route for parking the vehicle on the basis of the corrected road surface information,
wherein the external environment sensor includes a first sensor configured for two-dimensional detection around the vehicle, and a second sensor configured for three-dimensional detection around the vehicle,
the at least one processor is configured to:
permit a correction of the road surface information for the obstacle detected by the first sensor and not detected by the second sensor, and
prohibit the correction of the road surface information for the obstacle detected by the second sensor.

2. The parking assistance device according to claim 1, wherein the at least one processor is configured to cancel the prohibition of correction of the road surface information in a case where a predetermined operation is performed by the occupant.

3. The parking assistance device according to claim 1, further comprising a memory configured to store correction history of the road surface information.

4. The parking assistance device according to claim 1, wherein in a case where a plurality of obstacles has been detected, the at least one processor is configured to cause a display device to display a road surface information correction screen listing the plurality of obstacles, and
the at least one processor is configured to correct the road surface information for the obstacle selected by the occupant on the road surface information correction screen.

5. The parking assistance device according to claim 1, wherein in a case where the obstacle has been detected by the second sensor and has been selected to be invalidated by the occupant, the at least one processor is configured to cause a display device to:
display a notification to the occupant that the obstacle has been detected by the second sensor, and
prompt the occupant to choose whether or not to invalidate the object.

* * * * *